United States Patent
Ganesan et al.

(10) Patent No.: US 11,300,936 B2
(45) Date of Patent: Apr. 12, 2022

(54) EXTRACTING ETHERCAT DATAGRAMS FROM AN ETHERCAT FRAME

(71) Applicant: Lenovo (Singapore) PTE. LTD., New Tech Park (SG)

(72) Inventors: Karthikeyan Ganesan, Kaiserslautern (DE); Joachim Loehr, Wiesbaden (DE); Prateek Basu Mallick, Dreieich (DE); Ravi Kuchibhotla, Clarendon Hills, IL (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 17 days.

(21) Appl. No.: 16/364,677

(22) Filed: Mar. 26, 2019

(65) Prior Publication Data

US 2020/0310373 A1 Oct. 1, 2020

(51) Int. Cl.
*G05B 19/042* (2006.01)

(52) U.S. Cl.
CPC .. *G05B 19/042* (2013.01); *G05B 2219/25174* (2013.01); *G05B 2219/2642* (2013.01)

(58) Field of Classification Search
CPC ...... H04W 80/02; H04L 12/40; G05B 19/042; G05B 2219/331145; G05B 2219/25111; G05B 19/0421; G05B 19/04; G05B 2219/25174; G05B 2219/25179; G05B 2219/05; G05B 2219/2642; G05B 2219/31; G05B 2219/31019
USPC ......................................................... 370/389
See application file for complete search history.

(56) References Cited

U.S. PATENT DOCUMENTS

| | | | | |
|---|---|---|---|---|
| 8,510,551 | B1* | 8/2013 | Desai | H04L 12/18 709/224 |
| 2005/0141427 | A1* | 6/2005 | Bartky | H04L 47/2408 370/235 |
| 2006/0140128 | A1* | 6/2006 | Chi | H04L 43/50 370/241 |
| 2008/0049743 | A1* | 2/2008 | Zampetti | G04G 5/00 370/389 |

(Continued)

OTHER PUBLICATIONS

Xiaosheng et al., "EtherCAT Technology for the Network of Smart Substation", 2012 IEEE 7th International Power Electronics and motion Control Conference—ECCE Asia, Jun. 2-5, 2012—Harbin, China, pp. 2300-2304.

(Continued)

*Primary Examiner* — Phong La
(74) *Attorney, Agent, or Firm* — Kunzler Bean & Adamson

(57) ABSTRACT

Apparatuses, methods, and systems are disclosed for extracting EtherCAT datagrams from an EtherCAT frame. One method includes receiving an EtherCAT frame. The method includes determining a first EtherCAT datagram in the EtherCAT frame for a first device and a second EtherCAT datagram in the EtherCAT frame for a second device. The method includes extracting the first EtherCAT datagram from the EtherCAT frame to result in an extracted first EtherCAT datagram and the second EtherCAT datagram from the EtherCAT frame to result in an extracted second EtherCAT datagram. The method includes transmitting the extracted first EtherCAT datagram directly to the first device. The method includes transmitting the extracted second EtherCAT datagram directly to the second device.

20 Claims, 10 Drawing Sheets

(56) References Cited

U.S. PATENT DOCUMENTS

| | | | |
|---|---|---|---|
| 2008/0285520 A1* | 11/2008 | Forte | H04W 36/08 |
| | | | 370/331 |
| 2009/0141718 A1* | 6/2009 | Higashida | H04L 12/1836 |
| | | | 370/390 |
| 2011/0261812 A1* | 10/2011 | Kini | H04L 45/50 |
| | | | 370/389 |
| 2012/0170578 A1* | 7/2012 | Anumala | H04L 12/1886 |
| | | | 370/390 |
| 2015/0169351 A1* | 6/2015 | Song | H04L 45/66 |
| | | | 718/1 |
| 2015/0172220 A1 | 6/2015 | Rahamim | |
| 2015/0188691 A1* | 7/2015 | Mizuguchi | H04B 7/18513 |
| | | | 375/355 |
| 2016/0182251 A1* | 6/2016 | Weygandt | H04L 12/40163 |
| | | | 710/316 |
| 2017/0170983 A1 | 6/2017 | Iwai et al. | |
| 2018/0062984 A1* | 3/2018 | Hill | H04L 67/327 |
| 2018/0176132 A1* | 6/2018 | Bunte | H04L 45/74 |
| 2018/0227147 A1* | 8/2018 | Kataoka | H04L 12/40 |
| 2018/0266719 A1* | 9/2018 | Kim | F24F 11/54 |
| 2018/0270103 A1* | 9/2018 | Chapman | H04L 41/06 |
| 2018/0338265 A1* | 11/2018 | Goel | H04L 45/02 |
| 2018/0375799 A1* | 12/2018 | Liu | H04L 12/1886 |
| 2019/0109823 A1* | 4/2019 | Qiao | H04L 12/1435 |
| 2019/0253917 A1* | 8/2019 | Dao | H04M 15/8016 |
| 2020/0007223 A1* | 1/2020 | Zhu | H04B 7/15542 |

OTHER PUBLICATIONS

Qi et al., "Networked motion control system design based on EtherCAT", 2009 Second International Conference on Intelligent Computation Technology and Automation, IEEE Computer Society, pp. 77-79.

Jung et al., "An EtherCAT based Control System for Human-Robot Cooperation", Korea Electronic Technology Institute, IEEE, 2011, pp. 341-344.

PCT/IB2019/000307, "Notification of Transmittal of the International Search Report and the Written Opinion of the International Searching Authority, or the Declaration", dated Oct. 24, 2019, pp. 1-13.

* cited by examiner

EXTRACTING ETHERCAT DATAGRAMS FROM AN ETHERCAT FRAME

FIELD

The subject matter disclosed herein relates generally to wireless communications and more particularly relates to extracting EtherCAT datagrams from an EtherCAT frame.

BACKGROUND

The following abbreviations are herewith defined, at least some of which are referred to within the following description: Third Generation Partnership Project ("3GPP"), Five Generation System ("5GS"), Positive-Acknowledgment ("ACK"), Access and Mobility Management Function ("AMF"), Access Network ("AN"), Application Function ("AF"), Access Point ("AP"), Application Programming Interface ("API"), Access Point Name ("APN"), Aggregate MBR ("AMBR"), Automatic Repeat Request ("ARQ"), Application Server ("AS"), Base Station ("BS"), Bandwidth Part ("BWP"), Connection Management ("CM"), Core Network ("CN"), Communication Pattern ("CP"), Control Plane/User Plane ("CP/UP"), Cyclic Redundancy Check ("CRC"), Circuit Switched ("CS"), Downlink Control Information ("DCI"), Discontinuous Reception ("DRX"), Downlink ("DL"), Data Network Access Identifier ("DNAI"), Data Network ("DN"), Data Network Name ("DNN"), Domain Name System ("DNS"), Data Radio Bearer ("DRB"), Exchanged Data Rates for GSM Evolution ("EDGE"), Enhanced Discontinuous Reception ("eDRX"), Enhanced Mobile Broadband ("eMBB"), Evolved Node B ("eNB"), Evolved Packet System ("EPS"), Ethernet for Control Automation Technology ("EtherCAT"), Frame Check Sequence ("FCS"), 5G Node B ("gNB"), Home Public Land Mobile Network ("HPLMN"), Home Subscriber Server ("HSS"), Identity or Identifier or Identification ("ID"), IP Multimedia Subsystem ("IMS"), International Mobile Subscriber Identity ("IMSI"), Internet-of-Things ("IoT"), Internet Protocol ("IP"), Listen Before Talk ("LBT"), Long Term Evolution ("LTE"), Multiple Access ("MA"), Medium Access Control ("MAC"), Maximum Bit Rate ("MBR"), Modulation Coding Scheme ("MC S"), Mobile Country Code ("MCC"), Mobility Management ("MM"), Mobility Management Entity ("MME"), Mobile Network Code ("MNC"), Mobile Network Operator ("MNO"), Machine Type Communication ("MTC"), Master Information Block ("MIB"), Mobile Initiated Connection Only ("MICO"), Mobility Management ("MM"), Mobile Switching Center ("MSC"), Mobile Station International Subscriber Directory Number ("MSISDN"), Multiplexer ("MUX"), Control Plane Interface Between an AN and a 5GS ("N2 Interface"), Non-3GPP Interworking Functions ("N3IWF"), Non-Access Stratum ("NAS"), Narrowband ("NB"), North Bound Interface ("NBI"), Network Parameter Configuration ("NC"), Negative-Acknowledgment ("NACK") or ("NAK"), Network Exposure Function ("NEF"), Next Generation ("NG"), New Radio ("NR"), Next Generation Node B ("gNB"), Operating System ("OS"), Policy Control Function ("PCF"), Physical Downlink Control Channel ("PDCCH"), Packet Data Convergence Protocol ("PDCP"), Protocol Data Unit ("PDU"), PDN Gateway ("PGW"), Physical Layer ("PHY"), Public Land Mobile Network ("PLMN"), Packet Switched ("PS"), Physical Random Access Channel ("PRACH"), Physical Resource Block ("PRB"), Physical Uplink Shared Channel ("PUSCH"), Quality of Service ("QoS"), QoS Flow Identifiers ("QFIs"), Radio Access Network ("RAN"), Radio Access Technology ("RAT"), Radio Link Control ("RLC"), Radio Network Temporary Identity ("RNTI"), Radio Resource Control ("RRC"), Receive ("RX"), Service Access Point ("SAP"), Single Carrier Frequency Division Multiple Access ("SC-FDMA"), Service Capability Exposure Function ("SCEF"), Sidelink Control Information ("SCP"), Sub-carrier Spacing ("SCS"), Service Data Application Protocol ("SDAP"), Serving GPRS Support Node ("SGSN"), Sidelink ("SL"), Service Level Agreement ("SLA"), Subscriber Management ("SM"), Subscriber Management Function ("SMF"), Single Network Slice Selection Assistance Information ("S-NSSAI"), Subscriber Identity Module ("SIM"), System Information Block ("SIB"), Short Message Service ("SMS"), Signaling Radio Bearers ("SRBs"), Single Radio Voice Call Continuity ("SRVCC"), Session and Service Continuity ("SSC"), Subscription Concealed Identifier ("SUCI"), Subscription Permanent Identifier ("SUPI"), Transmit ("TX"), Unified Data Management ("UDM"), User Datagram Protocol ("UDP"), User Data Repository ("UDR"), User Entity/Equipment (Mobile Terminal) ("UE"), Universal Integrated Circuit Card ("UICC"), Uplink ("UL"), Universal Mobile Telecommunications System ("UMTS"), User Plane ("UP"), User Plane Function ("UPF"), Universal Terrestrial Radio Access ("UTRA"), Universal Terrestrial Radio Access Network ("UTRAN"), Universal Unique Identifier ("UUID"), Visited Public Land Mobile Network ("VPLMN"), WiFi Local Area Network ("WLAN").

In certain wireless communications networks, EtherCAT may be used for communicating information.

BRIEF SUMMARY

Methods for extracting EtherCAT datagrams from an EtherCAT frame are disclosed. Apparatuses and systems also perform the functions of the apparatus. In one embodiment, the method includes receiving an Ethernet for control automation technology frame. In various embodiments, the method includes determining a first Ethernet for control automation technology datagram in the Ethernet for control automation technology frame for a first device and a second Ethernet for control automation technology datagram in the Ethernet for control automation technology frame for a second device. In certain embodiments, the method includes extracting the first Ethernet for control automation technology datagram from the Ethernet for control automation technology frame to result in an extracted first Ethernet for control automation technology datagram and the second Ethernet for control automation technology datagram from the Ethernet for control automation technology frame to result in an extracted second Ethernet for control automation technology datagram. In some embodiments, the method includes transmitting the extracted first Ethernet for control automation technology datagram directly to the first device. In various embodiments, the method includes transmitting the extracted second Ethernet for control automation technology datagram directly to the second device.

An apparatus for extracting EtherCAT datagrams from an EtherCAT frame, in one embodiment, includes a receiver that receives an Ethernet for control automation technology frame. In various embodiments, the apparatus includes a processor that: determines a first Ethernet for control automation technology datagram in the Ethernet for control automation technology frame for a first device and a second Ethernet for control automation technology datagram in the Ethernet for control automation technology frame for a second device; and extracts the first Ethernet for control automation technology datagram from the Ethernet for control automation technology frame to result in an extracted first Ethernet for control automation technology datagram and the second Ethernet for control automation technology datagram from the Ethernet for control automation technology frame to result in an extracted second Ethernet for control automation technology datagram. In certain embodiments, the apparatus includes a transmitter that: transmits the extracted first Ethernet for control automation technology datagram directly to the first device; and transmits the extracted second Ethernet for control automation technology datagram directly to the second device.

One method for forming an EtherCAT frame from an EtherCAT datagram includes receiving an Ethernet for control automation technology datagram. In some embodiments, the method includes receiving common header information corresponding to the Ethernet for control automation technology datagram. In certain embodiments, the method includes forming an Ethernet for control automation technology frame based on the Ethernet for control automation technology datagram.

An apparatus for forming an EtherCAT frame from an EtherCAT datagram, in one embodiment, includes a receiver that: receives an Ethernet for control automation technology datagram; and receives common header information corresponding to the Ethernet for control automation technology datagram. In various embodiments, the apparatus includes a processor that forms an Ethernet for control automation technology frame based on the Ethernet for control automation technology datagram.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
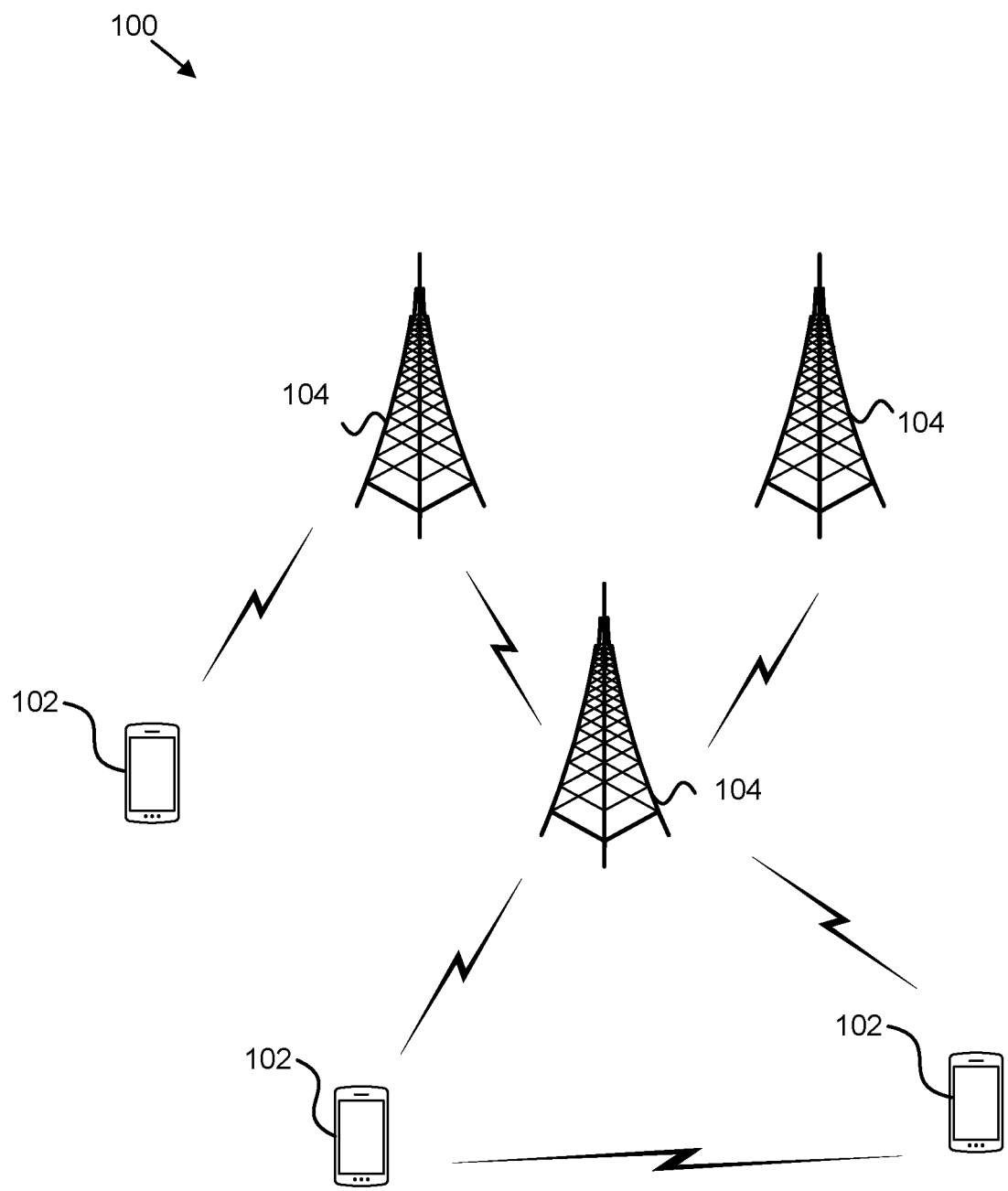
FIG. 1 is a schematic block diagram illustrating one embodiment of a wireless communication system for extracting EtherCAT datagrams from an EtherCAT frame.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for extracting EtherCAT datagrams from an EtherCAT frame. In one embodiment, the wireless communication system 100 includes remote units 102, and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. Moreover, the remote units 102 may communicate directly with other remote units 102 via SL communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a network device, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art. In some embodiments, a network unit 104 may include one or more of the following network components a gNB, a NG-RAN node, a RAN node, a core network, an MME, an HSS, an SCEF, an AMF, an SMF, an NEF, a PCF, a UDR, a UPF, and/or a UDM.

In one implementation, the wireless communication system 100 is compliant with the LTE of the 3GPP protocol, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In certain embodiments, a remote unit 102 may receive an Ethernet for control automation technology datagram. In some embodiments, the remote unit 102 may receive common header information corresponding to the Ethernet for control automation technology datagram. In certain embodiments, the remote unit 102 may form an Ethernet for control automation technology frame based on the Ethernet for control automation technology datagram. Accordingly, a remote unit 102 may be used for forming an EtherCAT frame from an EtherCAT datagram.

In various embodiments, a network unit 104 may receive an Ethernet for control automation technology frame. In various embodiments, the network unit 104 may determine a first Ethernet for control automation technology datagram in the Ethernet for control automation technology frame for a first device and a second Ethernet for control automation technology datagram in the Ethernet for control automation technology frame for a second device. In certain embodiments, the network unit 104 may extract the first Ethernet for control automation technology datagram from the Ethernet for control automation technology frame to result in an extracted first Ethernet for control automation technology datagram and the second Ethernet for control automation technology datagram from the Ethernet for control automation technology frame to result in an extracted second Ethernet for control automation technology datagram. In some embodiments, the network unit 104 may transmit the extracted first Ethernet for control automation technology datagram directly to the first device. In various embodiments, the network unit 104 may transmit the extracted second Ethernet for control automation technology datagram directly to the second device. Accordingly, a network unit 104 may be used for extracting EtherCAT datagrams from an EtherCAT frame.

Figure 2:
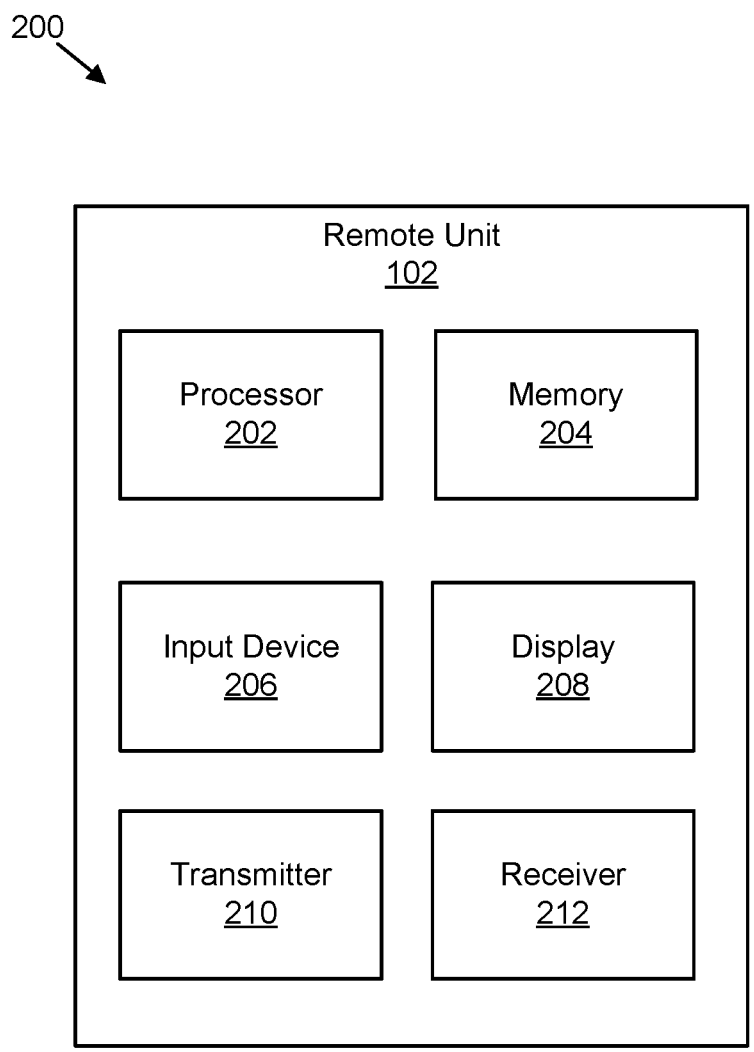
FIG. 2 is a schematic block diagram illustrating one embodiment of an apparatus that may be used for forming an EtherCAT frame from an EtherCAT datagram.

FIG. 2 depicts one embodiment of an apparatus 200 that may be used for forming an EtherCAT frame from an EtherCAT datagram. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 may form an EtherCAT frame based on an EtherCAT datagram. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to network registration. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. In one embodiment, the receiver 212 may: receive an EtherCAT datagram; and receive common header information corresponding to the EtherCAT datagram. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
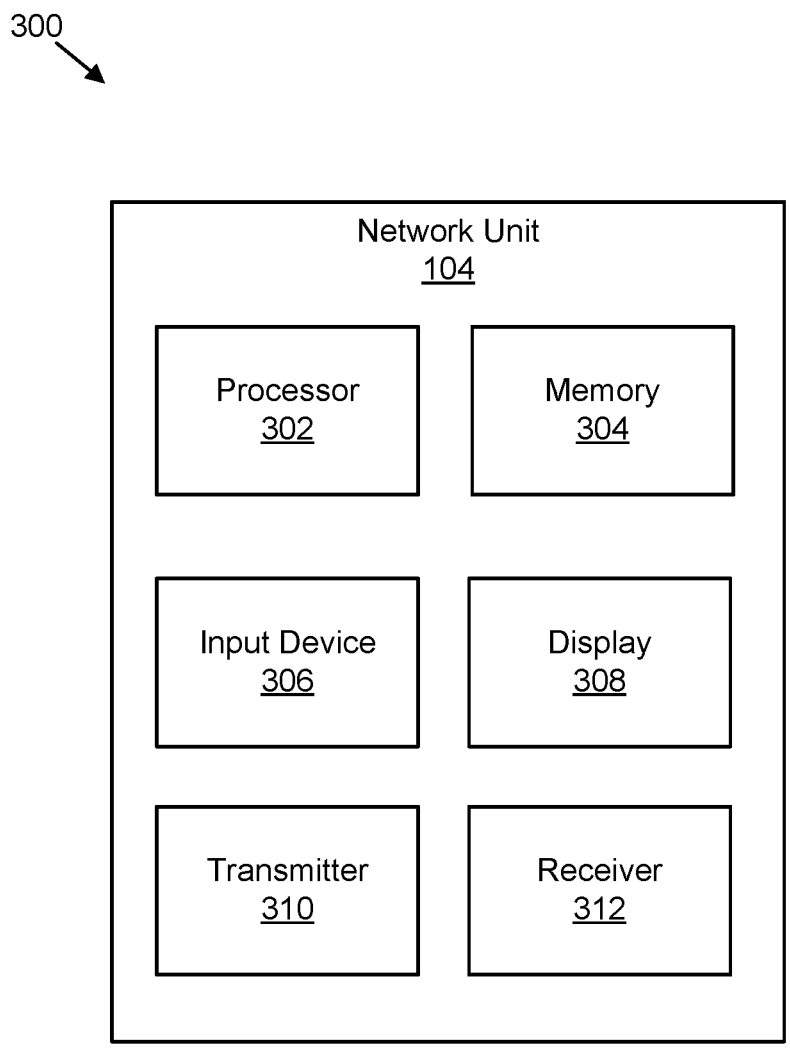
FIG. 3 is a schematic block diagram illustrating one embodiment of an apparatus that may be used for extracting EtherCAT datagrams from an EtherCAT frame.

FIG. 3 depicts one embodiment of an apparatus 300 that may be used for extracting EtherCAT datagrams from an EtherCAT frame. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the receiver 312 receives an EtherCAT frame. In various embodiments, the processor 302: determines a first EtherCAT datagram in the EtherCAT frame for a first device and a second EtherCAT datagram in the EtherCAT frame for a second device; and extracts the first EtherCAT datagram from the EtherCAT frame to result in an extracted first EtherCAT datagram and the second EtherCAT datagram from the EtherCAT frame to result in an extracted second EtherCAT datagram. In certain embodiments, the transmitter 310: transmits the extracted first EtherCAT datagram directly to the first device; and transmits the extracted second EtherCAT datagram directly to the second device.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, an Ethernet fieldbus may use fieldbus masters to send Ethernet packets to individual fieldbus slaves, or the fieldbus masters may broadcast to a group of fieldbus slaves. In such embodiments, the Ethernet packets may take the form of a fieldbus packet encapsulated inside an IP packet such as UDP. The fieldbus master may wait for the fieldbus slaves to process the received data and respond to the fieldbus master via a response packet.

In various embodiments, in an EtherCAT fieldbus system, Ethernet packets may be delayed by only a few nanoseconds by each fieldbus slave in the chain because the fieldbus slave reads and writes to the encapsulated datagram each time it is received. Accordingly, Ethernet packets are "processed on-the-fly." In such embodiments, if an EtherCAT master sends a frame, each fieldbus slave extracts its own data packet from an Ethernet datagram addressed specifically to it, while simultaneously forwarding the frame to the next device in the chain. Similarly, data to be returned to the EtherCAT master is inserted on-the-fly while the packet is processed by the fieldbus slave, as the Ethernet frame passes through the device.

Figure 4:
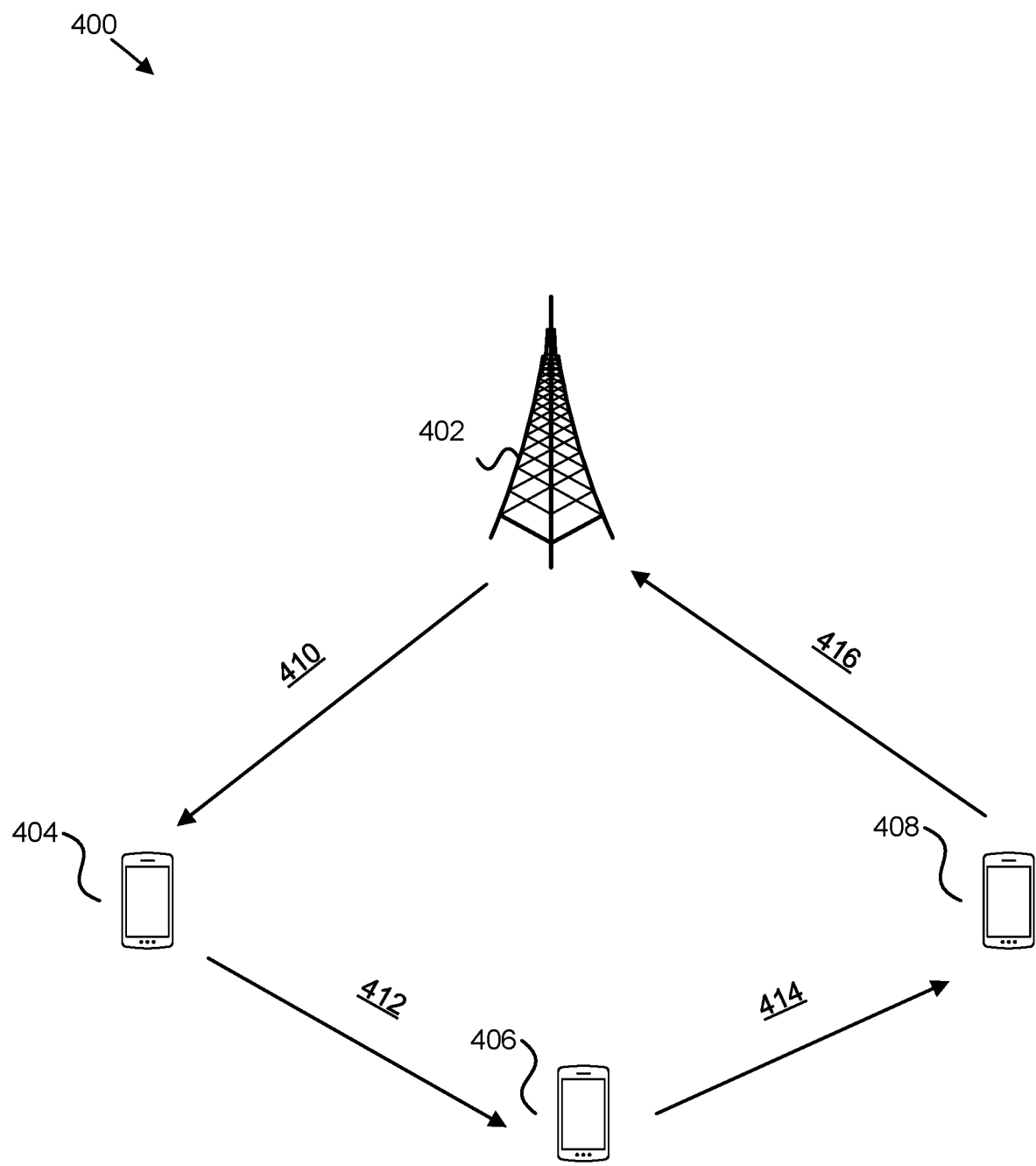
FIG. 4 is a schematic block diagram illustrating one embodiment of a system that may use EtherCAT frames.

FIG. 4 is a schematic block diagram illustrating one embodiment of a system 400 that may use EtherCAT frames. The system 400 is a wireless system. The system 400 includes an EtherCAT master 402 (e.g., a network unit 104), a first UE 404 (e.g., a first remote unit 102), a second UE 406 (e.g., a second remote unit 102), and a third UE 408 (e.g., a third remote unit 102). The EtherCAT master 402 transmits 410 an EtherCAT frame to the first UE 404. The first UE 404 processes the EtherCAT frame to extract an EtherCAT datagram corresponding to the first UE 404, then inserts data to be returned to the EtherCAT master 402 into the EtherCAT datagram of the EtherCAT frame corresponding to the first UE 404.

The first UE 404 then transmits 412 the revised EtherCAT frame to the second UE 406. The second UE 406 processes the revised EtherCAT frame to extract an EtherCAT datagram corresponding to the second UE 406, then inserts data to be returned to the EtherCAT master 402 into the EtherCAT datagram of the EtherCAT frame corresponding to the second UE 406.

The second UE 406 then transmits 414 the revised EtherCAT frame to the third UE 408. The third UE 408 processes the revised EtherCAT frame to extract an EtherCAT datagram corresponding to the third UE 408, then inserts data to be returned to the EtherCAT master 402 into the EtherCAT datagram of the EtherCAT frame corresponding to the third UE 408. The third UE 408 then transmits 416 the revised EtherCAT frame to the EtherCAT master 402. As may be appreciated, latency may be added by the processing done by each of the first UE 404, the second UE 406, and the third UE 408. This may result in high latency and inefficient use of resources (e.g., insufficient use of bandwidth with the entire EtherCAT transmitted to each of the first UE 404, the second UE 406, and the third UE 408).

Figure 5:
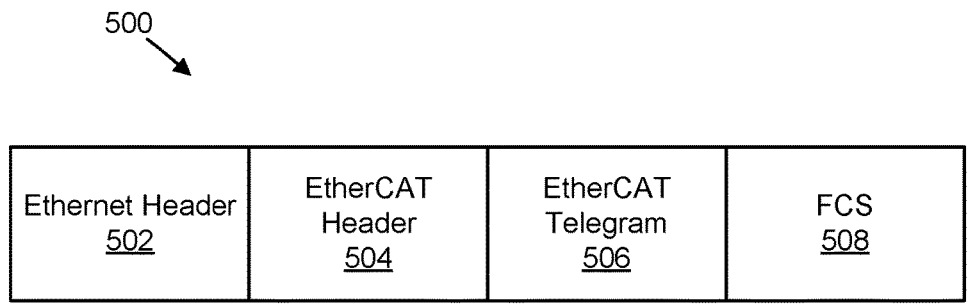
FIG. 5 is a schematic block diagram illustrating one embodiment of an EtherCAT frame.

FIG. 5 is a schematic block diagram illustrating one embodiment of an EtherCAT frame 500. The EtherCAT frame 500 includes an Ethernet header 502, an EtherCAT header 504, an EtherCAT telegram 506, and an FCS 508.

Figure 6:
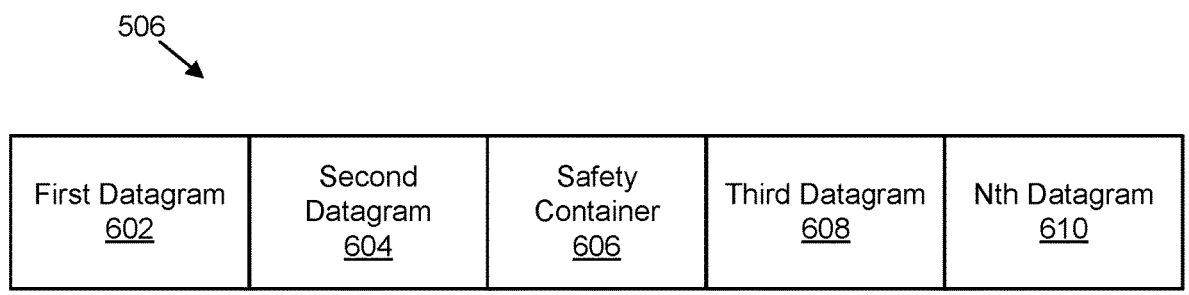
FIG. 6 is a schematic block diagram illustrating one embodiment of an EtherCAT telegram.

FIG. 6 is a schematic block diagram illustrating one embodiment of the EtherCAT telegram 506. The EtherCAT telegram 506 includes a first datagram 602, a second datagram 604, a safety container 606, a third datagram 608, and an nth datagram 610. As may be appreciated the EtherCAT telegram 506 may not include the safety container 606 and/or the EtherCAT telegram 506 may include fewer or more datagrams than illustrated. In one embodiment, the EtherCAT telegram 506 may include up to 15 datagrams. Each datagram may include a header, data to be read and/or written, and/or a working counter.

Figure 7:
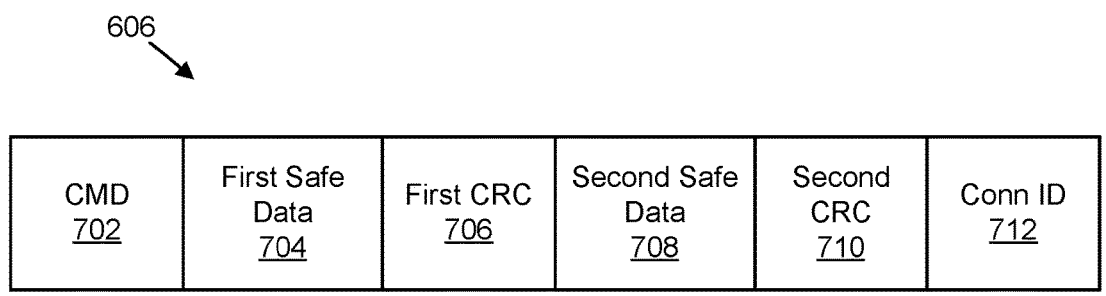
FIG. 7 is a schematic block diagram illustrating one embodiment of a safety container.

FIG. 7 is a schematic block diagram illustrating one embodiment of the safety container 606. As illustrated, the safety container 606 may include a command 702 ("CMD"), a first safe data 704, a first CRC 706 corresponding to the first safe data 704, a second safe data 708, a second CRC 710 corresponding to the second safe data 708, and a connection ID 712 ("Conn ID"). As may be appreciated, the safety container 606 may include any suitable number of safe data and CRCs corresponding to the safe data.

Figure 8:
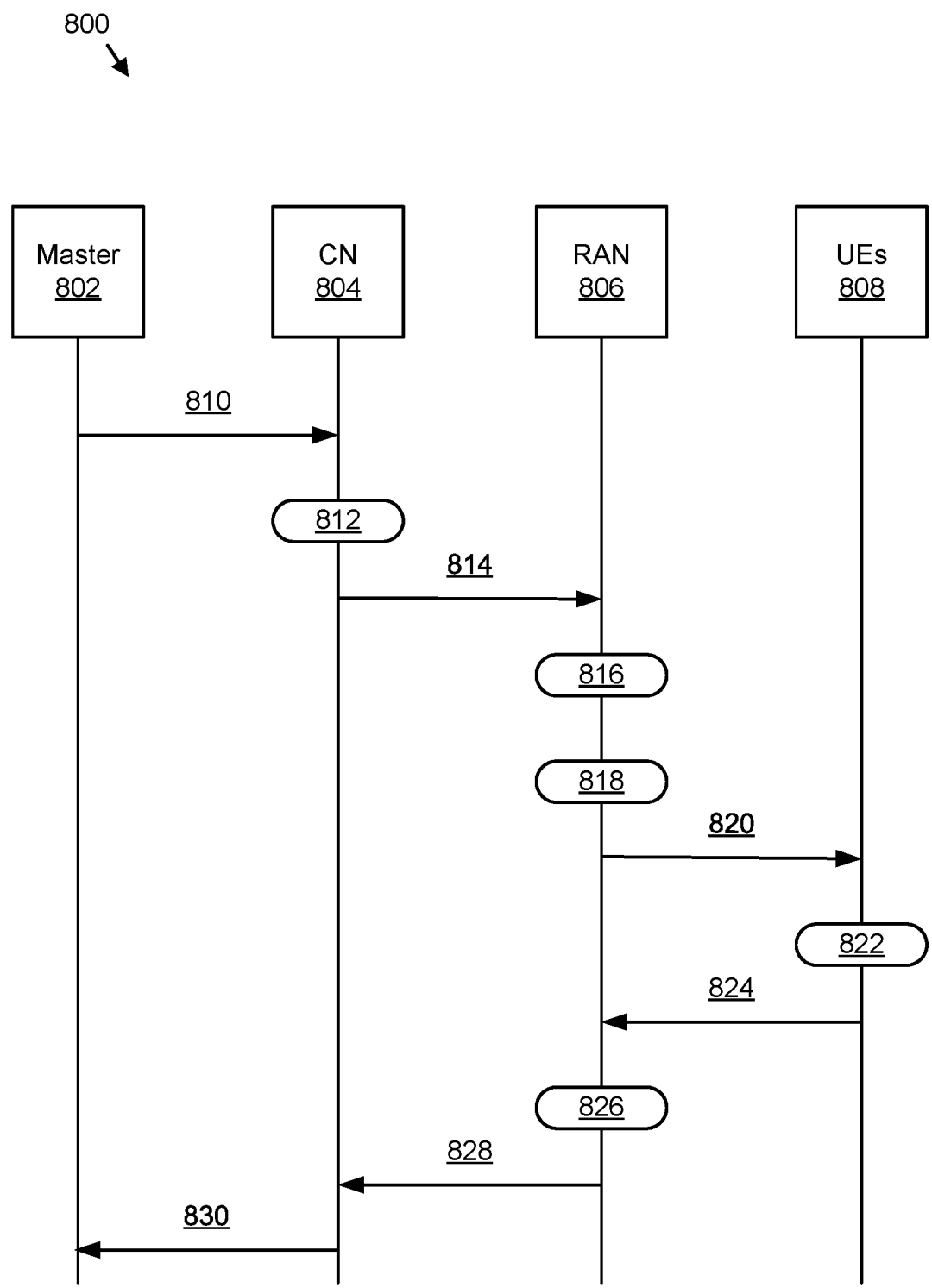
FIG. 8 is a schematic block diagram illustrating one embodiment of communications in a system that uses EtherCAT frames.

FIG. 8 is a schematic block diagram illustrating one embodiment of communications 800 in a system that uses EtherCAT frames. Communications 800 are illustrated between a master 802 (e.g., EtherCAT master), a CN 804 (e.g., UPF), a RAN 806 (e.g., eNB, gNB, BS, AP, NR, etc.), and UEs 808 (e.g., multiple UEs, multiple remote units 102, etc.). As may be appreciated, individual communications described herein may include one or more messages.

In one embodiment, in a first communication 810 transmitted from the master 802 to the CN 804, the master 802 transmits an EtherCAT frame. In certain embodiments, the CN 804 (e.g., UPF) marks the incoming EtherCAT frame from the master 802 with an Ethertype identifier ("Ethertype ID") and adds the EtherCAT frame to a QoS flow. The Ethertype ID may be used to indicate that the EtherCAT frame received from the master 802 is an EtherCAT frame. In certain embodiments, a supported and/or configured topology of a slave connection, such as line, ring, star etc., may be indicated to the RAN 806 either with the QoS flow or as part of an N2 Interface (e.g., via a bit field).

In various embodiments, in a second communication 814 transmitted from the CN 804 to the RAN 806, the CN 804 transmits the EtherCAT frame with the Ethertype ID to the RAN 806 as part of a QoS flow. In some embodiments, the RAN 806 (e.g., SDAP entity in the RAN 806 TX path) reads 816 the Ethertype ID in the QoS flow (e.g., and the topology information) and identifies the incoming Ethernet packet as an EtherCAT frame. In certain embodiments, the RAN 806 sets up 818 an Ethernet profile and context information corresponding to the EtherCAT frame to parse the EtherCAT telegram of the EtherCAT frame. This enables the RAN 806 to read, extract, and/or process the information in the EtherCAT telegram.

In various embodiments, the RAN 806 may read the EtherCAT telegram and segment the EtherCAT telegram into multiple datagrams (e.g., SDAP PDU's). The RAN 806 may map the datagrams to different radio bearers. The RAN 806 may schedule the datagrams (which include a node specific header and data) for unicast transmission for transmission to corresponding UEs 808. Moreover, the RAN 806 may schedule common header information (e.g., EtherCAT header 504) required for all UEs 808 (e.g., nodes) for multicast transmission.

In certain embodiments, the RAN 806 extracts the Ethertype ID (e.g., and the topology) from a QoS flow, reads the Ethertype ID (e.g., and the topology), determines whether the Ethertype ID matches an ID that corresponds to an EtherCAT frame structure (or any field bus protocol that does on the fly processing of an Ethernet frame), loads relevant profile information of the frame structure corresponding to the Ethertype ID, and parses the Ethernet packet according to the profile information. In such embodiments, parsing the packet Ethernet packet includes the reading, extracting, and/or processing information from the EtherCAT frame header. Moreover, in some embodiments, the RAN 806 extracts relevant details about nodes (e.g., UEs) such as an address of a node from each datagram header and a size of the data in the datagram. In various embodiments, an 'M' field in a datagram header may indicate the presence of more datagrams (e.g., a number of datagrams may be calculated) belonging to different slaves in an EtherCAT frame. As may be appreciated, a total size of an EtherCAT telegram may be determined from an EtherCAT header while a size of each datagram may be determined from a corresponding datagram header.

In certain embodiments, with information obtained by the RAN 806, the RAN 806 (e.g., SDAP entity) may segment an EtherCAT telegram of an EtherCAT frame into multiple SDAP PDU's with each PDU mapped to a radio bearers (e.g., different radio bearers). In some embodiments, the RAN 806 maps datagrams belonging to different destination addresses and/or different priority to different radio bearer IDs and/or priorities.

In various embodiments, context information, such as a slave address (e.g., destination address), extracted from a datagram header may be mapped to a radio bearer ID and/or RNTI and the context information may be stored in memory (e.g., in a stored table) to be used for incoming EtherCAT frames. In certain embodiments, a stored table may include information about destination addresses belonging to slaves mapped to radio bearer IDs.

In some embodiments, information, such as read, write, and/or read/write, extracted from a datagram header and a corresponding size may be passed on to lower layers for scheduling decisions. In such embodiments, if the datagram header includes a write option and a corresponding datagram size for a slave to master transmission, then a scheduler may generate a corresponding uplink-scheduling grant, and the datagram header may be transmitted without an empty data field. In embodiments in which the datagram contains both read and write options, then downlink and uplink grant may be generated.

In certain embodiments, in a third communication 820 transmitted from the RAN 806 to the UEs 808, the RAN 806 transmits the datagrams and the common header information to the UEs 808.

In various embodiments, the UEs 808 reconstruct 822 and reassemble an EtherCAT frame using one or more corresponding EtherCAT datagrams based on an EtherCAT telegram structure and an EtherCAT frame structure. Accordingly, an EtherCAT header, one or more EtherCAT datagram headers and their corresponding data re placed in the EtherCAT frame. Moreover, filler or padding bits may be added to match a size of the EtherCAT telegram mentioned in a length field of the EtherCAT header due to missing datagrams corresponding to other nodes (e.g., other UEs 808). The UEs 808 may transmit the reassembled EtherCAT frames to corresponding EtherCAT nodes. Moreover, the UEs 808 may receive EtherCAT frames from corresponding EtherCAT nodes. The UEs 808 may separate EtherCAT datagrams from the received EtherCAT frames from EtherCAT nodes and/or header information from the received EtherCAT frames from EtherCAT nodes.

In some embodiments, in a fourth communication 824 transmitted from the UEs 808 to the RAN 806, the UEs 808 transmit EtherCAT datagrams and/or header information to the RAN 806.

In various embodiments, the RAN 806 reconstructs 826 and reassembles datagrams received from the UEs 808 in a same order as that of the originally received EtherCAT telegram from the master 802. The RAN 806 reconstruct the EtherCAT telegram to include a common header. Moreover, the RAN 806 may add filler bits and/or datagram headers may include information to inform the master 802 about any lost datagrams from the UEs 808.

In some embodiments involving safety over EtherCAT, the RAN 806 may extract a safety message from a corresponding datagram (e.g., multiple safety messages from one or more corresponding datagrams). In certain embodiments, the RAN 806 may multicast one or more safety datagrams to different UEs 808.

In certain embodiments, information, such as an order in which the slave nodes (e.g., nodes connected to UEs 808) are connected in a topology, may be used for scheduling purposes. Accordingly, an order of connection of nodes may be stored and passed on to lower layers for scheduling purpose. In one example, a node connection order n1-n2-n3-n4 may be used to generate downlink and/or uplink grant order for slaves, resource mapping in via time and frequency resources, and/or slot scheduling. In another embodiment, a supported and/or configured topology of a slave connection, such as line, ring, star etc., may be indicated to the RAN 806 either with the QoS flow or as part of an N2 Interface.

In various embodiments, in a fifth communication 828 transmitted from the RAN 806 to the CN 804, the RAN 806 transmits the reconstructed EtherCAT frame to the CN 804. In some embodiments, in a sixth communication 830 transmitted from the CN 804 to the master 802, the CN 804 transmits the reconstructed EtherCAT frame to the master 802.

As may be appreciated, while the RAN 806 is described herein as segmenting and/or reconstructing an EtherCAT frame, in some embodiments, the master 802 may be directly connected to one or more of the UEs 808. In such embodiments, the one or more UEs 808 may perform the functions described herein in relation to the RAN 806. Thus, the one or more UEs 808 may segment PDUs to different radio bearers and transmit the segmented PDUs over Uu to the RAN 806 and/or over sidelink to other slaves directly.

Figure 9:
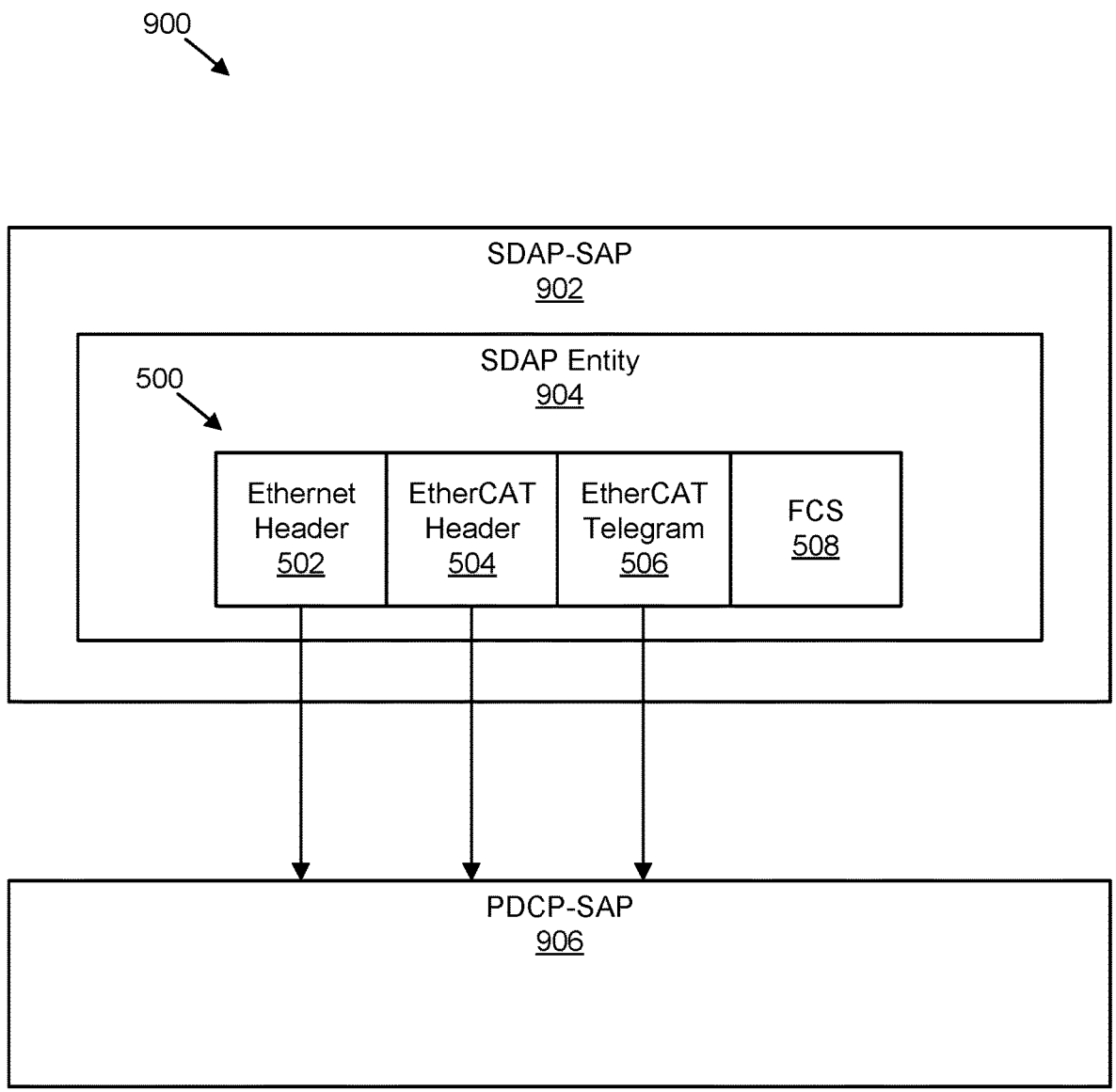
FIG. 9 is a schematic block diagram illustrating one embodiment of a mapping between an EtherCAT frame and a radio bearer.

FIG. 9 is a schematic block diagram illustrating one embodiment of a mapping 900 between an EtherCAT frame and a radio bearer. The mapping 900 includes an SDAP-SAP 902 that includes an SDAP entity 904. Moreover, the SDAP entity 904 include an EtherCAT frame 500. After the SDAP entity 904 parses the EtherCAT frame 500, the SDAP entity 904 transmits the Ethernet header 502, the EtherCAT header 504, and a datagram of the EtherCAT telegram 506 that corresponds to a PDCP-SAP 906 (e.g., radio bearer). As may be appreciated, each PDCP-SAP (e.g., radio bearer) in a system may receive the Ethernet header 502, the EtherCAT header 504, and a datagram of the EtherCAT telegram 506 that corresponds to the respective PDCP-SAP.

In some embodiments, a PDCP entity (e.g., the PDCP-SAP 906) may be notified about PDCP Ethernet header compression for a radio bearer carrying an EtherCAT header, an Ethernet header, a node specific header, and/or data. In one embodiment, RRC signaling may inform a PDCP entity about a compression profile ID, a context information indicating the static field in the header and its value, and so forth etc. In another embodiment, PDCP control PDU may be used to inform a PDCP entity about compression related information. In various embodiments, a compression ratio and/or field in the header chosen for compression may be dynamically adapted based on a channel condition, decompression feedback information, and/or available resources. In another embodiment, the compression profile ID and/or context information can be independently chosen for downlink, uplink, and/or sidelink.

Figure 10:
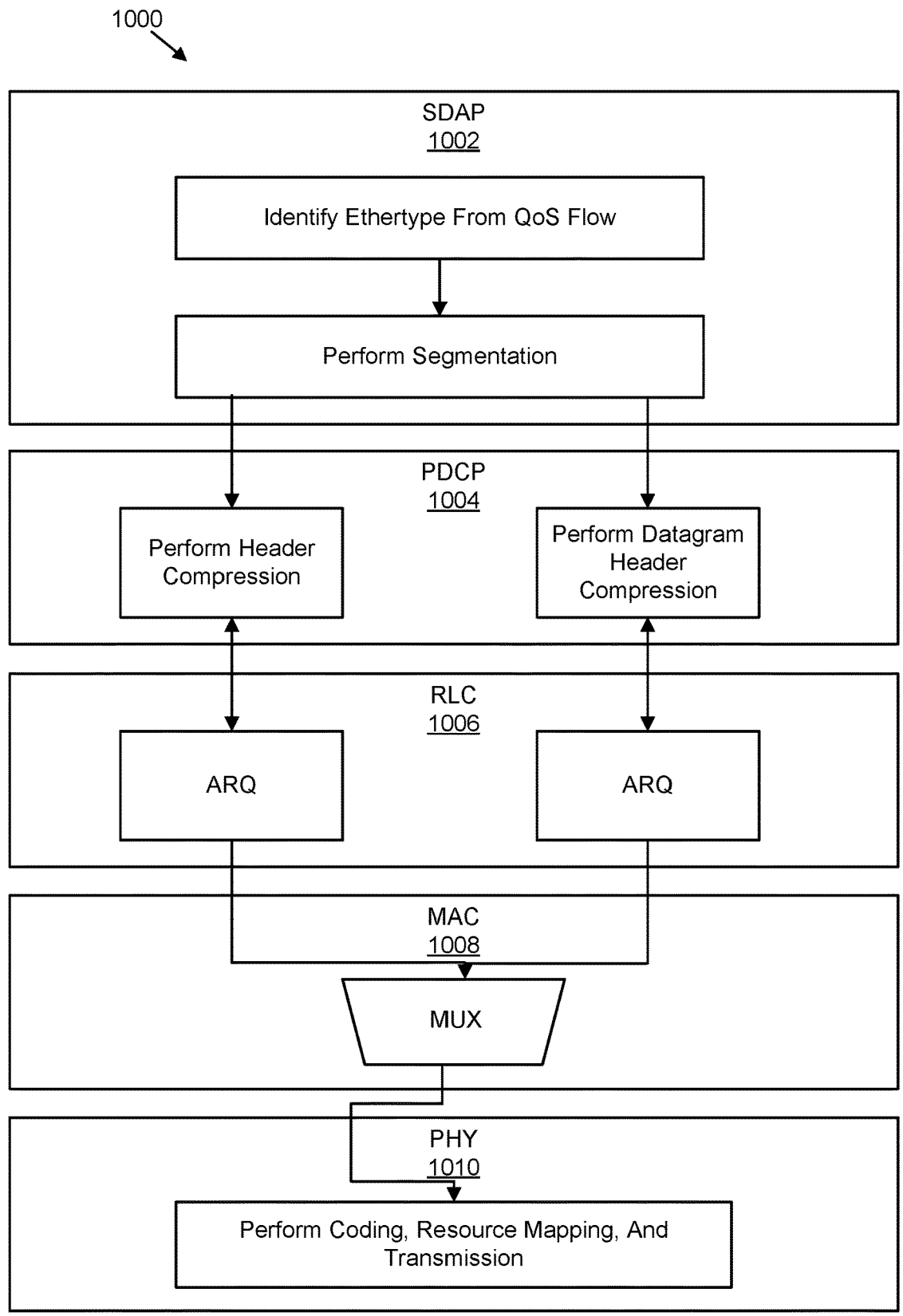
FIG. 10 is a schematic flow chart diagram illustrating one embodiment of a method for extracting EtherCAT datagrams from an EtherCAT frame.

FIG. 10 is a schematic flow chart diagram illustrating one embodiment of a method 1000 for extracting EtherCAT datagrams from an EtherCAT frame. The method 1000 in the illustrated embodiments uses an SDAP 1002, a PDCP 1004, an RLC 1006, a MAC 1008, and a PHY 1010. As illustrated, the SDAP 1002 may identify an Ethertype from a QoS flow, and perform segmentation. Moreover, the PDCP 1004 may perform header compression and perform datagram header compression. Furthermore, the RLC 1006 may transmit ARQ in response to receiving the compressed headers. The MAC 1008 may include a MUX that receives the compressed headers. In addition, the PHY 1010 may perform coding, resource mapping, and/or transmission.

Figure 11:
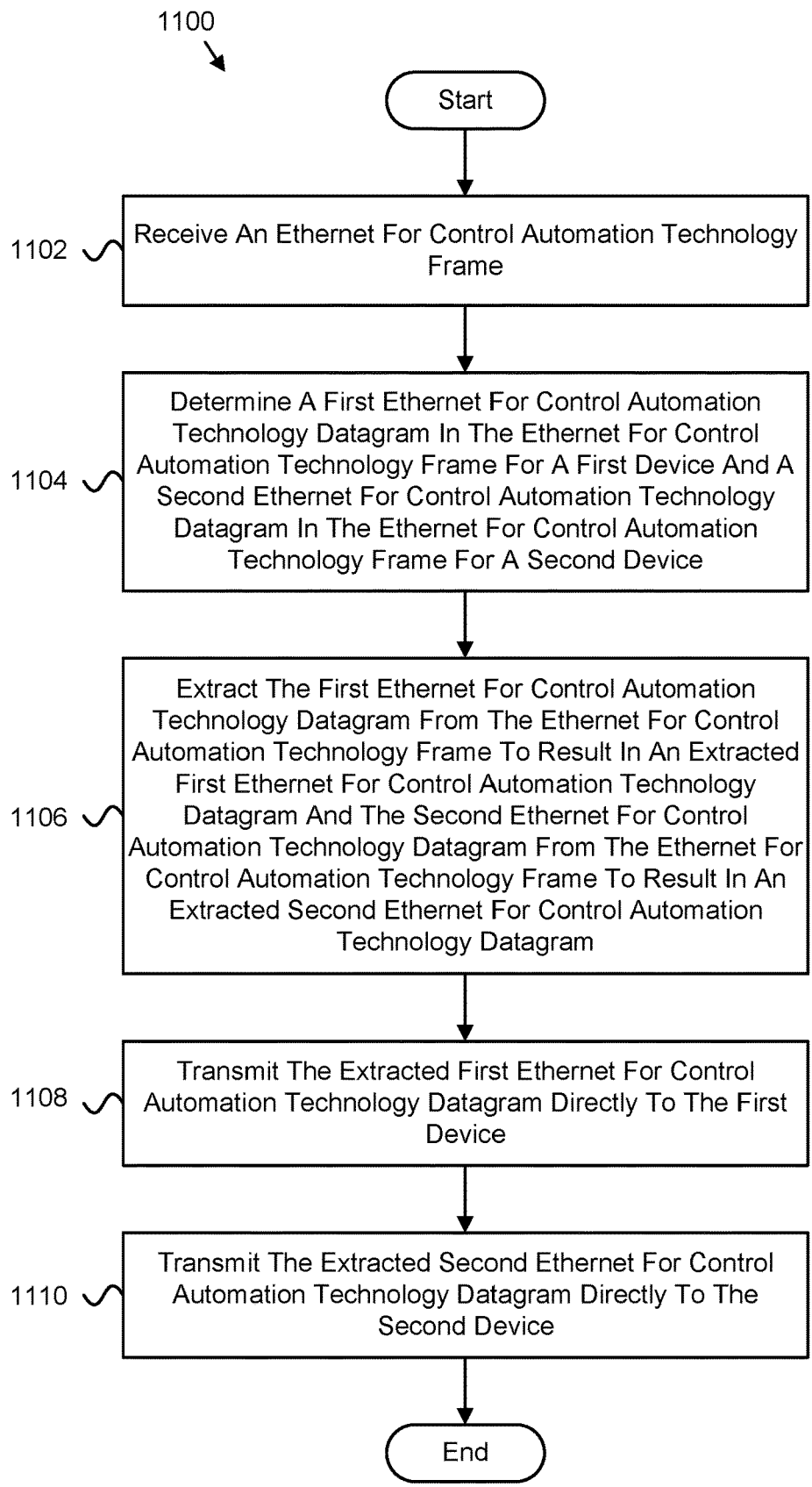
FIG. 11 is a schematic flow chart diagram illustrating another embodiment of a method for extracting EtherCAT datagrams from an EtherCAT frame.

FIG. 11 is a schematic flow chart diagram illustrating another embodiment of a method 1100 for extracting EtherCAT datagrams from an EtherCAT frame. In some embodiments, the method 1100 is performed by an apparatus, such as the network unit 104. In certain embodiments, the method 1100 may be performed by a processor executing program code, for example, a microcontroller, a microprocessor, a CPU, a GPU, an auxiliary processing unit, a FPGA, or the like.

The method 1100 may include receiving 1102 an Ethernet for control automation technology frame. In various embodiments, the method 1100 includes determining 1104 a first Ethernet for control automation technology datagram in the Ethernet for control automation technology frame for a first device (e.g., a first remote unit 102) and a second Ethernet for control automation technology datagram in the Ethernet for control automation technology frame for a second device (e.g., a second remote unit 102). In certain embodiments, the method 1100 includes extracting 1106 the first Ethernet for control automation technology datagram from the Ethernet for control automation technology frame to result in an extracted first Ethernet for control automation technology datagram and the second Ethernet for control automation technology datagram from the Ethernet for control automation technology frame to result in an extracted second Ethernet for control automation technology datagram. In some embodiments, the method 1100 includes transmitting 1108 the extracted first Ethernet for control automation technology datagram directly to the first device. In various embodiments, the method 1100 includes transmitting 1110 the extracted second Ethernet for control automation technology datagram directly to the second device.

In certain embodiments, the method 1100 further comprises transmitting common header information corresponding to the Ethernet for control automation technology frame to the first device and the second device. In some embodiments, the common header information is scheduled for multicast transmission and hence mapped to a multicast logical data channel and/or a multicast radio bearer. In various embodiments, the extracted first Ethernet for control automation technology datagram and the extracted second Ethernet for control automation technology datagram are scheduled for unicast transmission and hence mapped to a unicast logical data channel and/or a unicast radio bearer.

In one embodiment, the method 1100 further comprises receiving an identifier that indicates an incoming packet as the Ethernet for control automation technology frame. In certain embodiments, the method further comprises parsing the Ethernet for control automation technology frame based on an identified frame profile. In some embodiments, extracting the first Ethernet for control automation technology datagram and the second Ethernet for control automation technology datagram comprises: segmenting the Ethernet for control automation technology frame into a plurality of service data application protocol protocol data units; and mapping each service data application protocol protocol data unit of the plurality of service data application protocol protocol data units to a corresponding radio bearer.

In various embodiments, each service data application protocol protocol data unit comprises a priority, a destination address, or a combination thereof. In one embodiment, the method 1100 further comprises: receiving a first response from the first device, wherein the first response corresponds to the first Ethernet for control automation technology datagram; receiving a second response from the second device, wherein the first response corresponds to the first Ethernet for control automation technology datagram; and forming an Ethernet for control automation technology reply frame based on the first response and the second response. In certain embodiments, the method 1100 further comprises transmitting the Ethernet for control automation technology reply frame.

Figure 12:
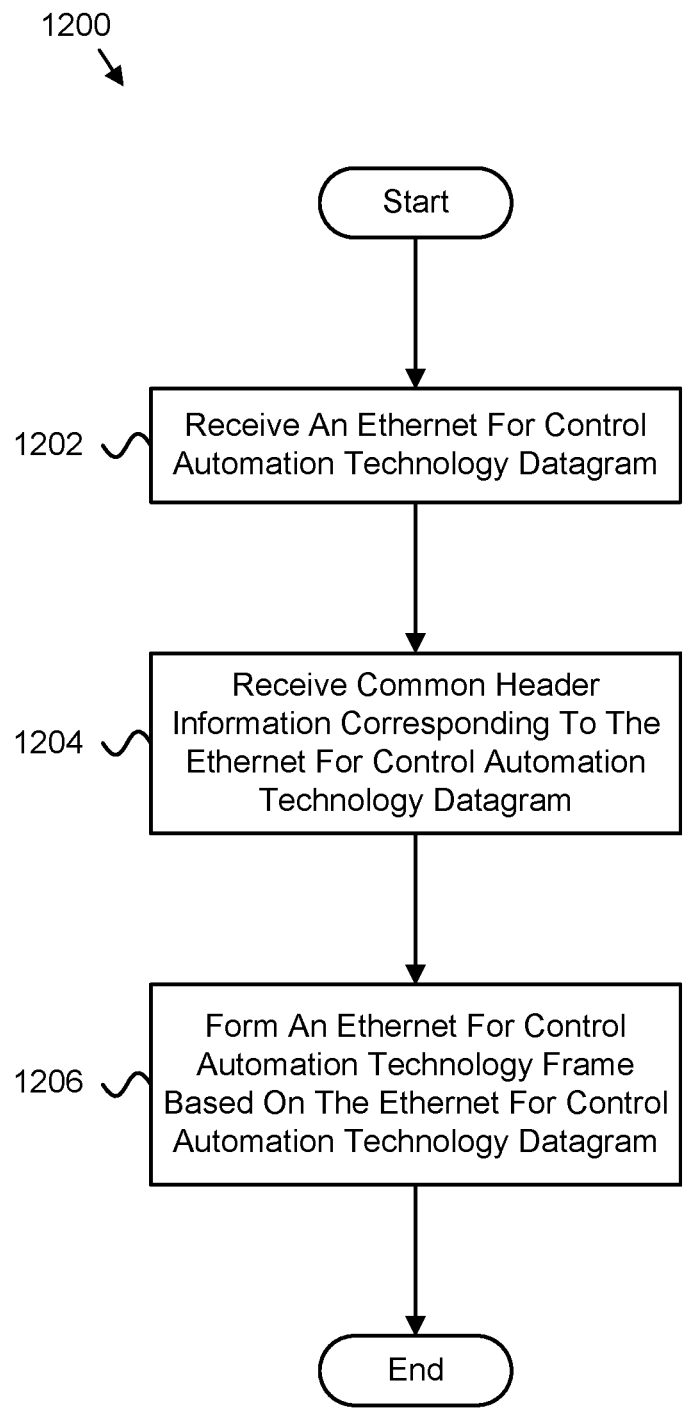
FIG. 12 is a schematic flow chart diagram illustrating one embodiment of a method for forming an EtherCAT frame from an EtherCAT datagram.

FIG. 12 is a schematic flow chart diagram illustrating one embodiment of a method 1200 for forming an EtherCAT frame from an EtherCAT datagram. In some embodiments, the method 1200 is performed by an apparatus, such as the remote unit 102. In certain embodiments, the method 1200 may be performed by a processor executing program code, for example, a microcontroller, a microprocessor, a CPU, a GPU, an auxiliary processing unit, a FPGA, or the like.

The method 1200 may include receiving 1202 an Ethernet for control automation technology datagram. In some embodiments, the method 1200 includes receiving 1204 common header information corresponding to the Ethernet for control automation technology datagram. In certain embodiments, the method 1200 includes forming 1206 an Ethernet for control automation technology frame based on the Ethernet for control automation technology datagram.

In certain embodiments, the method 1200 further comprises transmitting the Ethernet for control automation technology frame to a device. In some embodiments, the common header information is received from a multicast transmission. In various embodiments, the Ethernet for control automation technology datagram and is received from a unicast transmission.

In one embodiment, the method 1200 further comprises receiving an identifier that indicates an incoming packet as the Ethernet for control automation technology datagram. In certain embodiments, the method 1200 further comprises: receiving an Ethernet for control automation technology response frame from the device, wherein the Ethernet for control automation technology response frame corresponds to the Ethernet for control automation technology frame; and forming a response to the Ethernet for control automation technology datagram based on extracting information from the Ethernet for control automation technology response frame. In some embodiments, the method 1200 further comprises transmitting the response to the Ethernet for control automation technology datagram.

In one embodiment, a method comprises: receiving an Ethernet for control automation technology frame; determining a first Ethernet for control automation technology datagram in the Ethernet for control automation technology frame for a first device and a second Ethernet for control automation technology datagram in the Ethernet for control automation technology frame for a second device; extracting the first Ethernet for control automation technology datagram from the Ethernet for control automation technology frame to result in an extracted first Ethernet for control automation technology datagram and the second Ethernet for control automation technology datagram from the Ethernet for control automation technology frame to result in an extracted second Ethernet for control automation technology datagram; transmitting the extracted first Ethernet for control automation technology datagram directly to the first device; and transmitting the extracted second Ethernet for control automation technology datagram directly to the second device.

In certain embodiments, the method further comprises transmitting common header information corresponding to the Ethernet for control automation technology frame to the first device and the second device.

In some embodiments, the common header information is scheduled for multicast transmission.

In various embodiments, the extracted first Ethernet for control automation technology datagram and the extracted second Ethernet for control automation technology datagram are scheduled for unicast transmission.

In one embodiment, the method further comprises receiving an identifier that indicates an incoming packet as the Ethernet for control automation technology frame.

In certain embodiments, the method further comprises parsing the Ethernet for control automation technology frame based on an identified frame profile.

In some embodiments, extracting the first Ethernet for control automation technology datagram and the second Ethernet for control automation technology datagram comprises: segmenting the Ethernet for control automation technology frame into a plurality of service data application protocol protocol data units; and mapping each service data application protocol protocol data unit of the plurality of service data application protocol protocol data units to a corresponding radio bearer.

In various embodiments, each service data application protocol protocol data unit comprises a priority, a destination address, or a combination thereof.

In one embodiment, the method further comprises: receiving a first response from the first device, wherein the first response corresponds to the first Ethernet for control automation technology datagram; receiving a second response from the second device, wherein the first response corresponds to the first Ethernet for control automation technology datagram; and forming an Ethernet for control automation technology reply frame based on the first response and the second response.

In certain embodiments, the method further comprises transmitting the Ethernet for control automation technology reply frame.

In one embodiment, an apparatus comprises: a receiver that receives an Ethernet for control automation technology frame; a processor that: determines a first Ethernet for control automation technology datagram in the Ethernet for control automation technology frame for a first device and a second Ethernet for control automation technology datagram in the Ethernet for control automation technology frame for a second device; and extracts the first Ethernet for control automation technology datagram from the Ethernet for control automation technology frame to result in an extracted first Ethernet for control automation technology datagram and the second Ethernet for control automation technology datagram from the Ethernet for control automation technology frame to result in an extracted second Ethernet for control automation technology datagram; and a transmitter that: transmits the extracted first Ethernet for control automation technology datagram directly to the first device; and transmits the extracted second Ethernet for control automation technology datagram directly to the second device.

In certain embodiments, the transmitter transmits common header information corresponding to the Ethernet for control automation technology frame to the first device and the second device.

In some embodiments, the common header information is scheduled for multicast transmission.

In various embodiments, the extracted first Ethernet for control automation technology datagram and the extracted second Ethernet for control automation technology datagram are scheduled for unicast transmission.

In one embodiment, the receiver receives an identifier that indicates an incoming packet as the Ethernet for control automation technology frame.

In certain embodiments, the processor parses the Ethernet for control automation technology frame based on an identified frame profile.

In some embodiments, the processor extracting the first Ethernet for control automation technology datagram and the second Ethernet for control automation technology datagram comprises the processor: segmenting the Ethernet for control automation technology frame into a plurality of service data application protocol protocol data units; and mapping each service data application protocol protocol data unit of the plurality of service data application protocol protocol data units to a corresponding radio bearer.

In various embodiments, each service data application protocol protocol data unit comprises a priority, a destination address, or a combination thereof.

In one embodiment, the receiver: receives a first response from the first device, wherein the first response corresponds to the first Ethernet for control automation technology datagram; and receives a second response from the second device, wherein the first response corresponds to the first Ethernet for control automation technology datagram; and the processor forms an Ethernet for control automation technology reply frame based on the first response and the second response.

In certain embodiments, the transmitter transmits the Ethernet for control automation technology reply frame.

In one embodiment, a method comprises: receiving an Ethernet for control automation technology datagram; receiving common header information corresponding to the Ethernet for control automation technology datagram; and forming an Ethernet for control automation technology frame based on the Ethernet for control automation technology datagram.

In certain embodiments, the method further comprises transmitting the Ethernet for control automation technology frame to a device.

In some embodiments, the common header information is received from a multicast transmission.

In various embodiments, the Ethernet for control automation technology datagram and is received from a unicast transmission.

In one embodiment, the method further comprises receiving an identifier that indicates an incoming packet as the Ethernet for control automation technology datagram.

In certain embodiments, the method further comprises: receiving an Ethernet for control automation technology response frame from the device, wherein the Ethernet for control automation technology response frame corresponds to the Ethernet for control automation technology frame; and forming a response to the Ethernet for control automation technology datagram based on extracting information from the Ethernet for control automation technology response frame.

In some embodiments, the method further comprises transmitting the response to the Ethernet for control automation technology datagram.

In one embodiment, an apparatus comprises: a receiver that: receives an Ethernet for control automation technology datagram; and receives common header information corresponding to the Ethernet for control automation technology datagram; and a processor that forms an Ethernet for control automation technology frame based on the Ethernet for control automation technology datagram.

In certain embodiments, the apparatus further comprises a transmitter that transmits the Ethernet for control automation technology frame to a device.

In some embodiments, the common header information is received from a multicast transmission.

In various embodiments, the Ethernet for control automation technology datagram and is received from a unicast transmission.

In one embodiment, the receiver receives an identifier that indicates an incoming packet as the Ethernet for control automation technology datagram.

In certain embodiments: the receiver receives an Ethernet for control automation technology response frame from the device, wherein the Ethernet for control automation technology response frame corresponds to the Ethernet for control automation technology frame; and the processor forms a response to the Ethernet for control automation technology datagram based on extracting information from the Ethernet for control automation technology response frame.

In some embodiments, the apparatus further comprises a transmitter that transmits the response to the Ethernet for control automation technology datagram.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   receiving, at a base station, an Ethernet for control automation technology frame;

determining, at the base station, a first Ethernet for control automation technology datagram in the Ethernet for control automation technology frame for a first device and a second Ethernet for control automation technology datagram in the Ethernet for control automation technology frame for a second device;

extracting, at the base station, the first Ethernet for control automation technology datagram from the Ethernet for control automation technology frame to result in an extracted first Ethernet for control automation technology datagram and the second Ethernet for control automation technology datagram from the Ethernet for control automation technology frame to result in an extracted second Ethernet for control automation technology datagram;

transmitting, from the base station, the extracted first Ethernet for control automation technology datagram directly to the first device, wherein the first device comprises a first user equipment; and transmitting, from the base station, the extracted second Ethernet for control automation technology datagram directly to the second device, wherein the second device comprises a second user equipment different from the first user equipment.

2. The method of claim 1, further comprising transmitting common header information corresponding to the Ethernet for control automation technology frame to the first device and the second device.

3. The method of claim 2, wherein the common header information is scheduled for multicast transmission.

4. The method of claim 1, wherein the extracted first Ethernet for control automation technology datagram and the extracted second Ethernet for control automation technology datagram are scheduled for unicast transmission.

5. The method of claim 1, further comprising receiving an identifier that indicates an incoming packet as the Ethernet for control automation technology frame.

6. The method of claim 1, further comprising parsing the Ethernet for control automation technology frame based on an identified frame profile.

7. The method of claim 1, wherein extracting the first Ethernet for control automation technology datagram and the second Ethernet for control automation technology datagram comprises:

segmenting the Ethernet for control automation technology frame into a plurality of service data application protocol protocol data units; and mapping each service data application protocol protocol data unit of the plurality of service data application protocol protocol data units to a corresponding radio bearer.

8. The method of claim 7, wherein each service data application protocol protocol data unit comprises a priority, a destination address, or a combination thereof.

9. The method of claim 1, further comprising:

receiving a first response from the first device, wherein the first response corresponds to the first Ethernet for control automation technology datagram;

receiving a second response from the second device, wherein the first response corresponds to the first Ethernet for control automation technology datagram; and forming an Ethernet for control automation technology reply frame based on the first response and the second response.

10. The method of claim 9, further comprising transmitting the Ethernet for control automation technology reply frame.

11. An apparatus comprising a base station, the apparatus further comprising:

a receiver that receives an Ethernet for control automation technology frame;

a processor that:

determines a first Ethernet for control automation technology datagram in the Ethernet for control automation technology frame for a first device and a second Ethernet for control automation technology datagram in the Ethernet for control automation technology frame for a second device; and extracts the first Ethernet for control automation technology datagram from the Ethernet for control automation technology frame to result in an extracted first Ethernet for control automation technology datagram and the second Ethernet for control automation technology datagram from the Ethernet for control automation technology frame to result in an extracted second Ethernet for control automation technology datagram; and a transmitter that:

transmits the extracted first Ethernet for control automation technology datagram directly to the first device, wherein the first device comprises a first user equipment; and transmits the extracted second Ethernet for control automation technology datagram directly to the second device, wherein the second device comprises a second user equipment different from the first user equipment.

12. The apparatus of claim 11, wherein:

the receiver:

receives a first response from the first device, wherein the first response corresponds to the first Ethernet for control automation technology datagram; and receives a second response from the second device, wherein the first response corresponds to the first Ethernet for control automation technology datagram; and the processor forms an Ethernet for control automation technology reply frame based on the first response and the second response.

13. A method comprising:

receiving a first Ethernet for control automation technology datagram, wherein the first Ethernet for control automation technology datagram is extracted from an Ethernet for control automation technology frame, a second Ethernet for control automation technology datagram is extracted from the Ethernet for control automation technology frame, the first Ethernet for control automation technology datagram is received directly from a base station, and the second Ethernet for control automation technology datagram is transmitted directly from the base station;

receiving common header information corresponding to the first Ethernet for control automation technology datagram; and forming a local Ethernet for control automation technology frame based on the Ethernet for control automation technology datagram.

14. The method of claim 13, further comprising transmitting the local Ethernet for control automation technology frame to a device.

15. The method of claim 13, wherein the common header information is received from a multicast transmission.

16. The method of claim 13, wherein the first Ethernet for control automation technology datagram and is received from a unicast transmission.

17. The method of claim 13, further comprising receiving an identifier that indicates an incoming packet as the first Ethernet for control automation technology datagram.

18. The method of claim 13, further comprising:
receiving an Ethernet for control automation technology response frame from the device, wherein the Ethernet for control automation technology response frame corresponds to the first Ethernet for control automation technology frame; and
forming a response to the first Ethernet for control automation technology datagram based on extracting information from the Ethernet for control automation technology response frame.

19. The method of claim 18, further comprising transmitting the response to the first Ethernet for control automation technology datagram.

20. An apparatus comprising a base station, the apparatus further comprising:
a receiver that:
receives a first Ethernet for control automation technology datagram, wherein the first Ethernet for control automation technology datagram is extracted from an Ethernet for control automation technology frame, a second Ethernet for control automation technology datagram is extracted from the Ethernet for control automation technology frame, the first Ethernet for control automation technology datagram is received directly from a base station, and the second Ethernet for control automation technology datagram is transmitted directly from the base station; and
receives common header information corresponding to the first Ethernet for control automation technology datagram; and
a processor that forms a local Ethernet for control automation technology frame based on the Ethernet for control automation technology datagram.

* * * * *